Oct. 3, 1944.　　　T. L. HAYES　　　2,359,309

DRILLING TOOL

Filed July 2, 1942

Inventor
Thomas L. Hayes

By G. J. Kesenich ~ J. H. Church

Attorneys

Patented Oct. 3, 1944

2,359,309

UNITED STATES PATENT OFFICE 2,359,309

DRILLING TOOL

Thomas L. Hayes, Dover, N. J.

Application July 2, 1942, Serial No. 449,456

2 Claims. (Cl. 77—55)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a tool holder, more particularly a boring or drilling attachment for controlling the depth of holes drilled in articles, and specifically to an attachment for use in boring burster charge cavities in shell noses where the depth of the cavity must be held within close tolerance.

An object of this invention is to provide a drilling and boring attachment for use with a boring cutter to control the depth of a hole bored by said cutter. Another object is to provide in such an attachment means for holding a boring cutter and means whereby the attachment may be chucked in a drill press or like machine. Another object of the invention is to provide a simple attachment incorporating a cutting tool which has a shoulder relatively rotatable with respect to both the tool and driving machine, said shoulder serving as a stop for engagement with the work to limit the penetration of the work by the cutting tool.

Other objects and advantages of the invention will be apparent from the following description of a preferred embodiment thereof as shown in the accompanying drawing in which.

Figure 1:
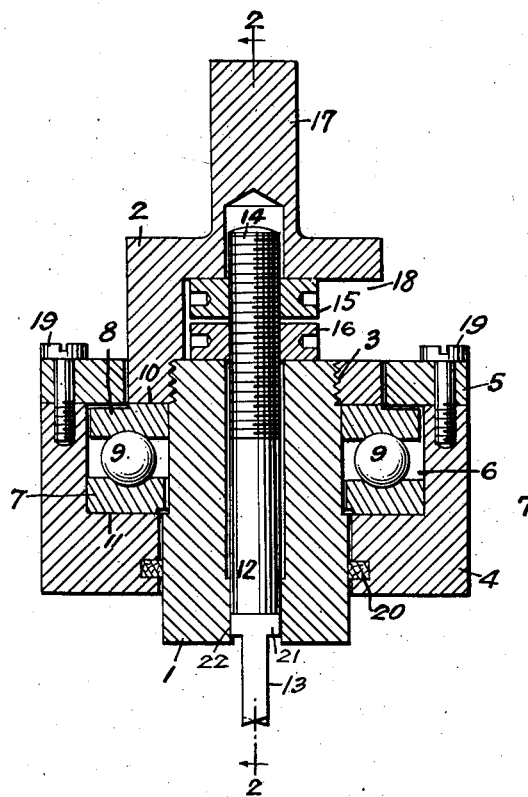
Fig. 1 is a view in section of an attachment incorporating a tool.
Figure 2:
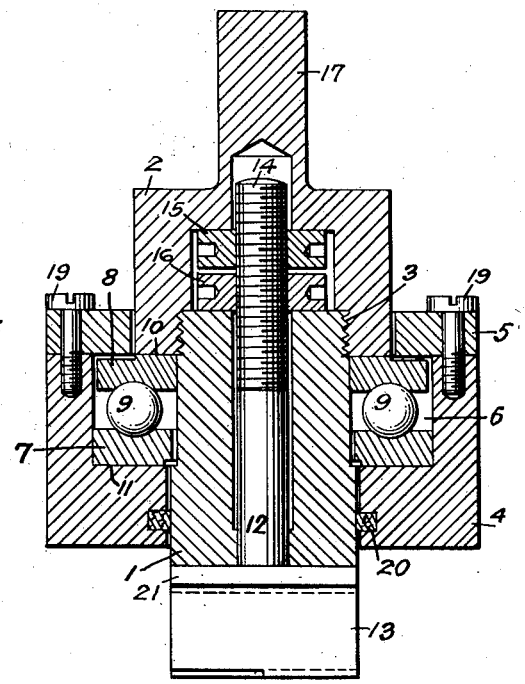
Fig. 2 is a similar view of the attachment taken along the line 2—2 of Fig. 1.
Figure 3:
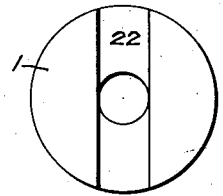
Fig. 3 is a bottom plan view of the tool holding sleeve.

The attachment according to the invention includes a cutting-tool holder, means for attaching said holder to a boring machine, a work-engaging stop means, and complementary thrust bearing elements carrying said tool holder and said stop means respectively.

Referring to the drawing, a holder for the cutting-tool is comprised of a sleeve 1 and a shank 2 integrally united at 3 by mating threads. A collar comprising a cylindrical member 4 and a retaining ring 5, surrounds the tool holder and provides, together with the tool holder, an inclosed annular space 6 housing a thrust bearing consisting of lower and upper races 7 and 8, respectively, including ball bearings 9. Upper race 8 bears against the lower surface 10 of the shank but not against the lower surface of retaining ring 5. Lower race 7 bears against the horizontal inner surface 11 of the bottom portion of the collar but not against any portion of the tool holder sleeve 1. The collar serves as a work-engaging stop means, the under surface of the collar being adapted to engage the upper surface of a piece of work being drilled, thereby limiting penetration of the tool into the work.

A tool 12 having cutting blade 13 and threaded tang 14 is inserted in the tool holder, the shoulder 21 of the tool resting in the slot 22 of the sleeve 1. Lock nuts 15 and 16 secure the tool in the holder at the desired setting, nut 15 being backed against the tool holder shank and nut 16 being screwed in the opposite direction against the top of the tool holder sleeve, whereby the tool is held rigidly in the holder. Thus is provided means for adjusting and locking the tool in the holder, nut 16 functioning as an adjusting nut and nut 15 functioning as a locking nut.

The tool holder shank is provided with an aperture 18 through which the lock nuts may be inserted and adjusted.

The tool holder shank is provided further with an extension 17 for engagement in the chuck of a conventional rotary driving machine such as a drill press. Of course, alternatively, the tool holder may be fixed, as in the tail stock of a lathe, and the work may be rotated relatively to it, as by the lathe head.

The attachment is assembled by screwing the sleeve 1 into the shank 2. Thrust bearing 7, 8, 9 is placed inside the collar as shown. The assembled tool holder next is inserted downwardly into the lower portion 4 of the collar until the shoulder 10 of the shank rests against the upper race 8 of the thrust bearing. Retaining ring 5 then is placed over the lower portion of the collar and is secured in position by screws 19.

The lower portion of the collar preferably is provided with a groove 20 containing suitable packing material to seal the annular bearing space against admission of damaging particles of foreign material, such as chips and the like, and also to retain lubricant within the bearing space.

In operation, a boring tool 12 is assembled to the attachment with its lower cutting surface positioned the desired distance below the lower surface of the collar. The attachment, mounting the tool, is then fixed in a drill press or the like and the hole is bored in the work in conventional manner. When the desired depth of hole has been made the lower surface of the collar comes in contact with the upper surface of the work and prevents the tool from going any deeper. Thrust forces tending to drive the tool beyond the desired depth are absorbed in the thrust bearing, the collar remaining stationary against the work and the tool holder and tool rotating together upon the bearing within the collar.

It will be seen that this invention provides a useful and simple attachment for controlling the depth of drilled holes. The embodiment herein described is intended to be merely illustrative of the invention and not limitative thereof, the appended claims being definitive of the scope of the invention.

I claim:

1. A drilling attachment comprising a tool holder formed in part by a substantially cylindrical sleeve having a bore therethrough for the reception of a tool provided with a threaded end portion and in part by a shank secured to said sleeve providing, in conjunction with said sleeve, a chambered portion adjacent one end of said sleeve, said shank further providing a side opening for said chamber, a rotatable collar disposed about said tool holder, providing, with said holder, an inclosed annular space, a thrust bearing within said space comprising complementary bearing elements, one of which elements bears solely on said collar and the other of which bears solely on said tool holder, whereby thrust forces tending to move said tool holder longitudinally with respect to said collar are absorbed in said bearing, and means in said chambered portion adjustable through said opening cooperating with the threaded end portion of a tool received therein, with a wall of said chambered portion and with said sleeve to adjust and lock the tool relative to said sleeve and shank.

2. The drilling attachment of claim 1, characterized in that the adjusting and locking means for the tool comprises an adjusting nut and a locking nut.

THOMAS L. HAYES.